United States Patent
Hamme et al.

(10) Patent No.: US 10,547,744 B2
(45) Date of Patent: Jan. 28, 2020

(54) METHODS, APPARATUS AND SYSTEMS FOR ADJUSTING DO-NOT-DISTURB (DND) LEVELS BASED ON CALLERS AND MEETING ATTENDEES

(71) Applicant: IoT Holdings, Inc., Wilmington, DE (US)

(72) Inventors: Damian C. Hamme, Horsham, PA (US); Kenneth F. Lynch, Wayne, PA (US); Vincent Roy, Longueuil (CA)

(73) Assignee: IoT Holdings, Inc., Wilmington, DE (US)

( * ) Notice: Subject to any disclaimer, the term of this patent is extended or adjusted under 35 U.S.C. 154(b) by 0 days.

(21) Appl. No.: 16/066,252

(22) PCT Filed: Dec. 22, 2016

(86) PCT No.: PCT/US2016/068395
§ 371 (c)(1),
(2) Date: Jun. 26, 2018

(87) PCT Pub. No.: WO2017/117014
PCT Pub. Date: Jul. 6, 2017

(65) Prior Publication Data
US 2019/0014209 A1    Jan. 10, 2019

Related U.S. Application Data

(60) Provisional application No. 62/272,883, filed on Dec. 30, 2015.

(51) Int. Cl.
*H04M 3/42* (2006.01)
*H04M 3/436* (2006.01)
*H04M 1/725* (2006.01)
*H04W 4/16* (2009.01)

(52) U.S. Cl.
CPC ....... *H04M 3/436* (2013.01); *H04M 1/72566* (2013.01); *H04M 1/72572* (2013.01); *H04M 3/42153* (2013.01); *H04M 3/42365* (2013.01); *H04M 2203/2072* (2013.01); *H04M 2242/14* (2013.01); *H04W 4/16* (2013.01)

(58) Field of Classification Search
CPC ..................................................... H04W 8/18
See application file for complete search history.

(56) References Cited

U.S. PATENT DOCUMENTS

| | | |
|---|---|---|
| 7,443,971 B2 | 10/2008 | Bear et al. |
| 7,769,039 B2 | 4/2010 | Oral et al. |
| 7,996,476 B2 | 8/2011 | Geffner et al. |
| 8,355,491 B1 | 1/2013 | Butt |

(Continued)

*Primary Examiner* — Shantell L Heiber
(74) *Attorney, Agent, or Firm* — Eric Berkowitz

(57) ABSTRACT

Representative methods, apparatus and systems to adjust Do Not Disturb (DND) levels in a wireless transmit/receive unit (WTRU) are disclosed. One representative method includes determining, by the WTRU, that a user of the WTRU is participating or is going to participate in a meeting; obtaining, by the WTRU, organizational hierarchy information; determining a priority associated with one or more meeting participants based on the organizational hierarchy information; and adjusting, without user input, a DND level of the WTRU based on the determined priority.

18 Claims, 7 Drawing Sheets

(56) References Cited

U.S. PATENT DOCUMENTS

| | | | |
|---|---|---|---|
| 8,385,884 B1* | 2/2013 | Hertzfeld | H04M 3/436 |
| | | | 455/411 |
| 8,655,958 B2 | 2/2014 | Callanan et al. | |
| 8,874,660 B2 | 10/2014 | Denner et al. | |
| 9,002,331 B2 | 4/2015 | Nunally | |
| 2004/0223599 A1* | 11/2004 | Bear | H04M 3/436 |
| | | | 379/207.02 |
| 2008/0084894 A1* | 4/2008 | Oral | G06Q 10/10 |
| | | | 370/429 |
| 2008/0126481 A1 | 5/2008 | Chakra et al. | |
| 2008/0159490 A1* | 7/2008 | Gaudin | H04M 3/38 |
| | | | 379/88.16 |
| 2009/0083827 A1* | 3/2009 | Denner | G06Q 10/107 |
| | | | 726/1 |
| 2010/0115033 A1* | 5/2010 | Geffner | G06Q 10/107 |
| | | | 709/206 |
| 2010/0153160 A1* | 6/2010 | Bezemer | G06Q 10/06 |
| | | | 705/7.12 |
| 2010/0169431 A1 | 7/2010 | Denner et al. | |
| 2011/0022968 A1* | 1/2011 | Conner | G06Q 10/10 |
| | | | 715/753 |
| 2014/0164011 A1 | 6/2014 | Guelich et al. | |
| 2014/0267559 A1* | 9/2014 | Krantz | H04M 9/082 |
| | | | 348/14.08 |
| 2015/0317892 A1 | 11/2015 | Raj | |

* cited by examiner

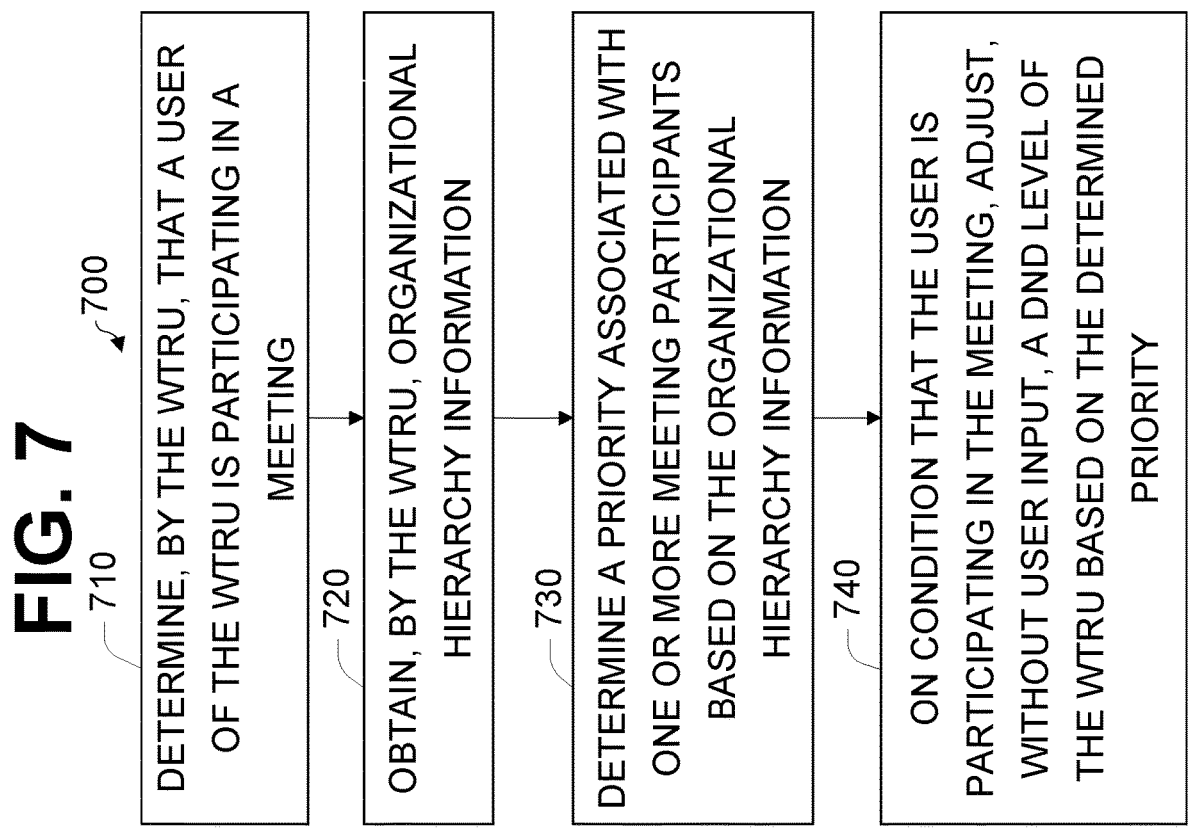

METHODS, APPARATUS AND SYSTEMS FOR ADJUSTING DO-NOT-DISTURB (DND) LEVELS BASED ON CALLERS AND MEETING ATTENDEES

CROSS REFERENCE TO RELATED APPLICATIONS

This application is a National Stage Application under 35 U.S.C. 371 of International Application No. PCT/US16/68395, filed Dec. 22, 2016 and claims priority from U.S. Provisional Application No. 62/272,883, filed Dec. 30, 2015, the contents of each of which are incorporated by reference herein.

FIELD

The present invention relates to the field of communications and, more particularly, to methods, apparatus and systems that adjust DND levels.

BRIEF DESCRIPTION OF THE DRAWINGS

A more detailed understanding may be had from the Detailed Description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the Figures indicate like elements, and wherein:

FIG. 7 is a flowchart illustrating a representative method; and

FIG. 8 is a flowchart illustrating another representative method.

DETAILED DESCRIPTION

Although the detailed description is illustrated and described herein with reference to specific embodiments, the invention is not intended to be limited to the details shown. Rather, various modifications may be made in the details within the scope and range of equivalents of the claims and without departing from the invention.

Figure 1:
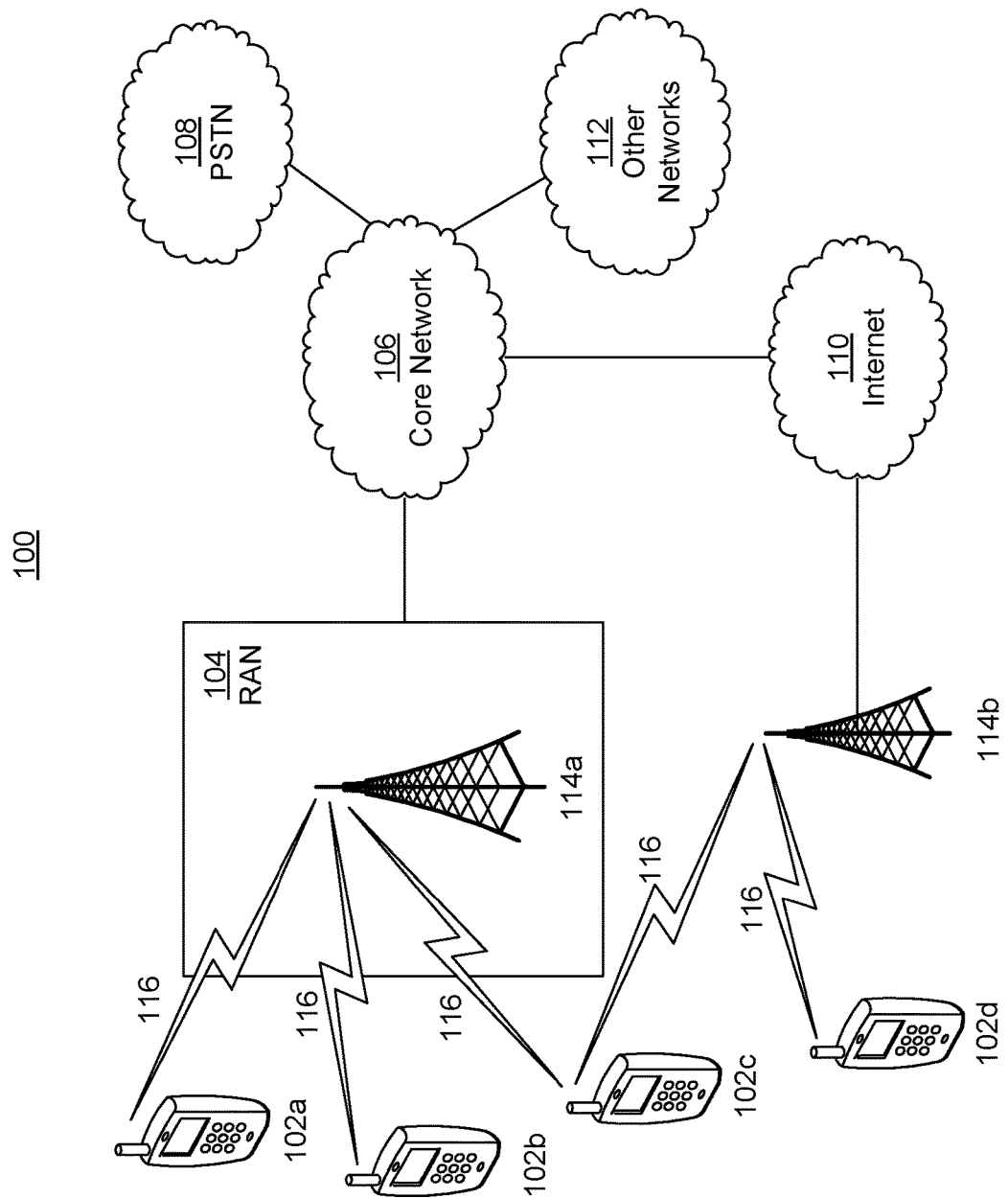
FIG. 1 is a system diagram illustrating a representative communication system in which various embodiments may be implemented.

FIG. 1 is a system diagram illustrating a representative communication system 100 in which various embodiments may be implemented.

The communication system 100 may be a multiple access system that may provide content, such as voice, data, video, messaging, and/or broadcast, among others, to multiple wireless users. The communication system 100 may enable multiple wireless users to access such content through the sharing of system resources, including wireless bandwidth. For example, the communication systems 100 may use one or more channel access methods, such as code division multiple access (CDMA), time division multiple access (TDMA), frequency division multiple access (FDMA), orthogonal FDMA (OFDMA), and/or single-carrier FDMA (SCFDMA), among others.

As shown in FIG. 1, the communication system 100 may include: (1) WTRUs 102a, 102b, 102c and/or 102d; (2) a RAN 104; a CN 106; a public switched telephone network (PSTN) 108; the Internet 110; and/or other networks 112. It is contemplated that the disclosed embodiments may include any number of WTRUs, base stations, networks, and/or network elements. Each of the WTRU s 102a, 102b, 102c, or 102d may be any type of device configured to operate and/or communicate in a wireless environment. By way of example, the WTRUs 102a, 102b, 102c or 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, and/or consumer electronics, among others.

The communication system 100 may also include a base station 114a and a base station 114b. Each of the base stations 114a or 114b may be any type of device configured to wirelessly interface with at least one of the WTRU s 102a, 102b, 102c, and/or 102d to facilitate access to one or more communication networks, such as the CN 106, the Internet 110, and/or the other networks 112. By way of example, the base stations 114a and 114b may be a base transceiver station (BTS), a Node-B, an eNode B, a Home Node B, a Home eNode B, a site controller, an access point (AP), and/or a wireless router, among others. While the base stations 114a, 114b are each depicted as a single element, it is contemplated that the base stations 114a and 114b may include any number of interconnected base stations and/or network elements.

The base station 114a may be part of the RAN 104, which may include other base stations and/or network elements (not shown), such as a base station controller (BSC), a radio network controller (RNC), and/or relay nodes, among others. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three cell sectors. In certain exemplary embodiments, the base station 114a may include three transceivers, i.e., one for each sector of the cell. In various exemplary embodiments, the base station 114a may employ multiple-input multiple output (MIMO) technology and, may utilize multiple transceivers for each sector of the cell.

The base stations 114a and 114b may communicate with one or more of the WTRUs 102a, 102b, 102c and/or 102d over an air interface 116, which may be any suitable wireless communication link (e.g., radio frequency (RF), microwave, infrared (IR), ultraviolet (UV) and/or visible light, among others). The air interface 116 may be established using any suitable radio access technology (RAT).

As noted above, the communication system 100 may be a multiple access system and may employ one or more channel access schemes, such as CDMA, TDMA, FDMA, OFDMA, and/or SCFDMA, among others. For example, the base station 114a in the RAN 104 and the WTRUs 102a, 102b, and 102c may implement a RAT such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In certain exemplary embodiments, the base station 114a and the WTRUs 102a, 102b and 102c may implement a RAT such as Evolved UMTS Terrestrial Radio Access (E-UTRA), which may establish the air interface 116 using Long Term Evolution (LTE) and/or LTE-Advanced (LTE-A).

In certain exemplary embodiments, the base station 114a and the WTRUs 102a, 102b and 102c may implement RAT such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), and/or GSM EDGE (GERAN), among others.

The base station 114b in FIG. 1 may be a wireless router, Home Node B, Home eNode B, or access point, for example, and may utilize any suitable RAT for facilitating wireless connectivity in a localized area, such as a place of business, a home, a vehicle, and/or a campus, among others. In certain exemplary embodiments, the base station 114b and the WTRUs 102c and 102d may implement a RAT such as IEEE 802.11 to establish a wireless local area network (WLAN). In certain exemplary embodiments, the base station 114b and the WTRUs 102c and 102d may implement a RAT such as IEEE 802.15 to establish a wireless personal area network (WPAN). In certain exemplary embodiments, the base station 114b and the WTRUs 102c and 102d may utilize a cellular based RAT (e.g., WCDMA, CDMA2000, GSM, LTE, LTE-A, etc.) to establish a picocell or femtocell. As shown in FIG. 1, the base station 114b may have a direct connection to the Internet 110. The base station 114b may access the Internet 110 via the CN 106 or may access the Internet directly or through a different access network.

The RAN 104 may be in communication with the CN 106, which may be any type of network configured to provide voice, data, applications, and/or voice over internet protocol (VoIP) services to one or more of the WTRUs 102a, 102b, 102c, and/or 102d. For example, the CN 106 may provide call control, billing services, mobile location-based services, pre-paid calling, Internet connectivity, video distribution, and/or perform high-level security functions, such as user authentication, among others. Although not shown in FIG. 1, it is contemplated that the RAN 104 and/or the CN 106 may be in direct or indirect communication with other RANs that employ the same RAT as the RAN 104 or a different RAT. For example, in addition to being connected to the RAN 104, which may be utilizing an E-UTRA radio technology, the CN 106 may also be in communication with another RAN employing a GSM radio technology.

The CN 106 may also serve as a gateway for the WTRUs 102a, 102b, 102c, and 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The other networks 112 may include wired or wireless communication networks owned and/or operated by other service providers. For example, the other networks 112 may include another CN connected to one or more RANs, which may employ the same RAT as the RAN 104 or a different RAT.

Some or all of the WTRUs 102a, 102b, 102c and 102d in the communication system 100 may include multi-mode capabilities, (e.g., the WTRUs 102a, 102b, 102c, and/or 102d may include multiple transceivers for communicating with different wireless networks over different wireless links). For example, the WTRU 102c may be configured to communicate with the base station 114a, which may employ a cellular-based RAT, and with the base station 114b, which may employ an IEEE 802 RAT.

Figure 2:
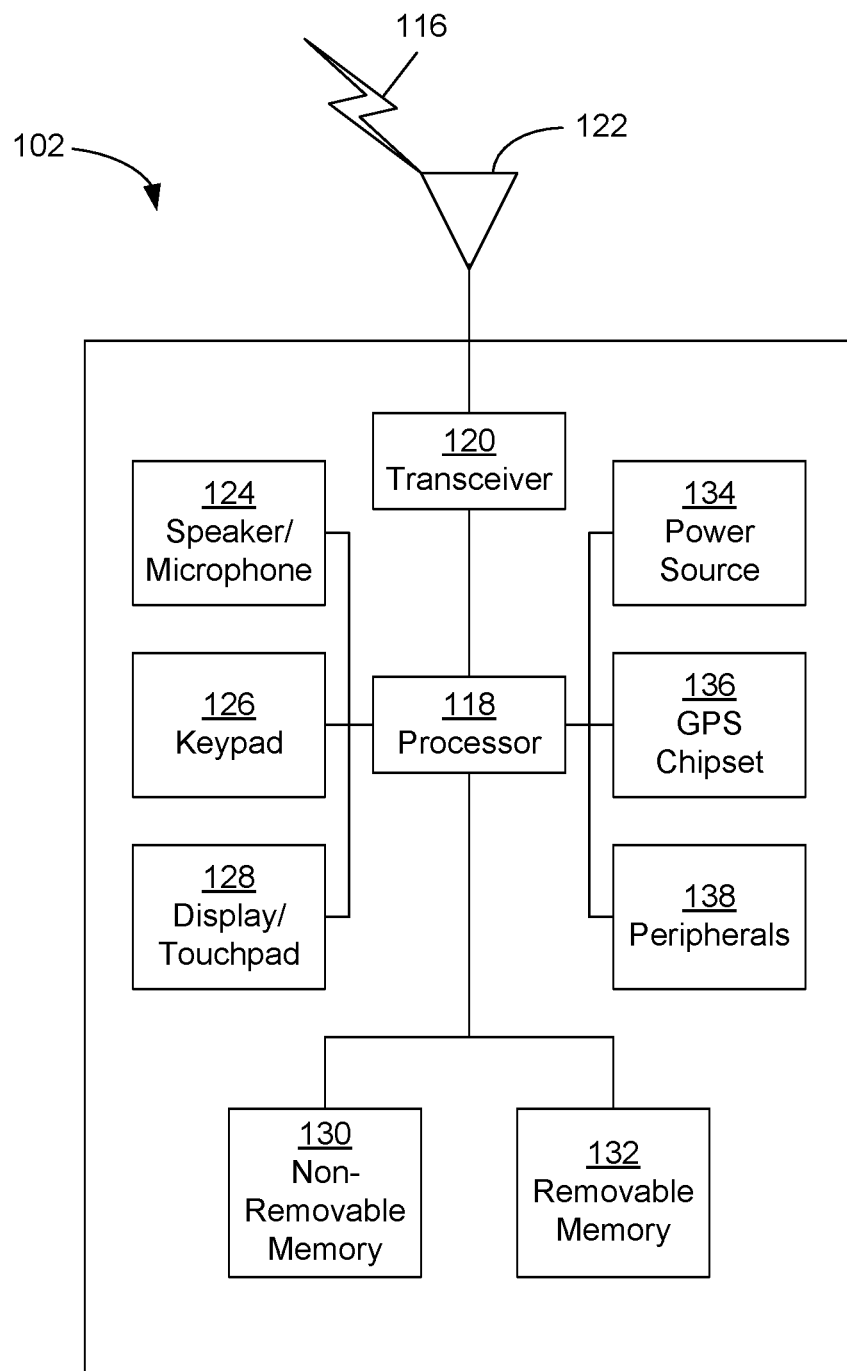
FIG. 2 is diagram illustrating a representative wireless transmit/receive unit (WTRU) that may execute various representative procedures.

FIG. 2 is a system diagram illustrating a representative WTRU that may be used with the procedures set forth herein.

As shown in FIG. 2, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and/or other peripherals 138, among others. It is contemplated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), and/or a state machine, among others. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. Although FIG. 2 depicts the processor 118 and the transceiver 120 as separate components, it is contemplated that the processor 118 and the transceiver 120 may be integrated together in an electronic package or chip. The transmit/receive element 122 may be configured to transmit signals to, or receive signals from, a base station (e.g., the base station 114a) over the air interface 116. For example, in certain exemplary embodiments, the transmit/receive element 122 may be an antenna configured to transmit and/or receive radio frequency (RF) signals. In various exemplary embodiments, the transmit/receive element 122 may be an emitter/detector configured to transmit and/or receive infrared (IR), ultraviolet (UV), and/or visible light signals, for example. In some exemplary embodiments, the transmit/receive element 122 may be configured to transmit and receive both RF and light signals. It is contemplated that the transmit/receive element 122 may be configured to transmit and/or receive any combination of wireless signals.

Although the transmit/receive element 122 is depicted in FIG. 2, as a single element, the WTRU 102 may include any number of transmit/receive elements 122 and/or may employ MIMO technology. In certain exemplary embodiments, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. The transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) unit or organic light emitting diode (OLED) display unit)). The processor 118 may output user data to the speaker/microphone 124, the keypad 126, and/or the display/touch pad 128. The processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of fixed memory storage device. The removable memory 132 may include a subscriber identity module (SIM) card, a memory stick, and/or a secure digital (SD) memory card, among others. In certain exemplary embodiments, the processor 118 may access information from, and store data in, memory that is not physically located at and/or on the WTRU 102, such as on a server or a home computer (not shown).

The processor 118 may be configured to receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), and/or lithium ion (Li-ion), among others), solar cells, and/or fuel cells, among others.

The processor 118 may be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a and/or 114b) and/or may determine its location based on the timing of the signals being received from two or more nearby base stations. It is contemplated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, and/or an Internet browser, among others.

Figure 3:
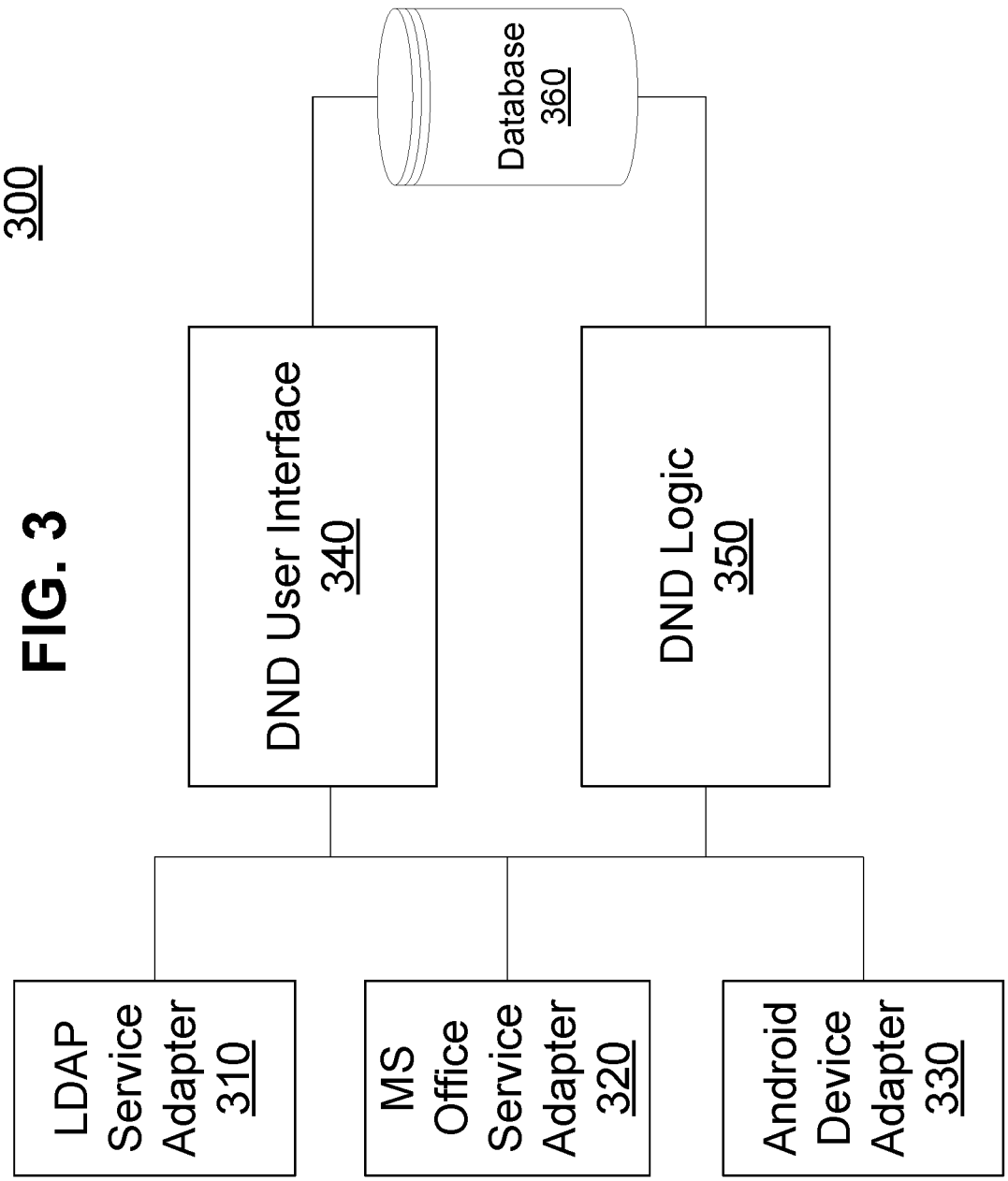
FIG. 3 is a diagram illustrating a representative DND system.

FIG. 3 is a diagram illustrating a representative DND system.

Referring to FIG. 3, the representative DND system 300 may include a number of different adapters (e.g., a LDAP Service adapter 310, a MS Office Service adapter 320 and/or an Android Device adapter 330, among others), a DND user interface 340, DND logic 350, and/or a database 360. The DND user interface 340 may provide and/or present an interface to allow the user to: (1) create and/or generate a profile; (2) configure one or more policies, and/or otherwise configure the DND system 300. The database 360 may store data used by the DND logic 350 such as user profile information and/or policy information. The DND logic 350 may perform the core logic of the DND system 300 and may determine how to notify the user based on the available context. The adapters 310, 320 and 330 (e.g., the LDAP, the MS Office and the Android adapters, among others) may interface with and/or connect to outside systems and/or services. The DND Logic 350 may adjust its behavior based on which services are available.

The WTRU 102 may communicate via the transceiver 120 and/or other communication modules (e.g., Bluetooth and/or other modules) with one or more network servers, personal computers, and/or handheld devices, among others (for example via the adapters 310, 320 and 330) to retrieve DND level adjustment information including, for example, organizational information, location information, scheduling information and/or other information of meeting participants and/or potential meeting interrupters (e.g., notifiers, for example callers and/or texters, among others) to enable dynamic adjustment of DND levels in the WTRU 102 (e.g., based on rules associated with the meeting participants and/or potential meeting interrupters). A meeting interrupter (sometimes referred to herein as a notifier, a caller, a texter, a meeting intervenor and/or a sender), may be a person or device providing a notification to the user of a WTRU 102 via the WTRU 102, which may or may not be suppressed by the DND operations, functions and/or capabilities of the WTRU 102. The meeting interrupter may wish to draw the attention of the user of the WTRU 102 and/or provide a notification to the user of the WTRU 102.

In certain representative embodiments, a Do Not Disturb (DND) level may be automatically adjusted on a user's device based on whether a meeting includes superiors, peers and/or subordinates.

DND is a feature, function and/or operation that may allow a user to set different levels for notification on a particular WTRU 102 or other device, and, if desirable, for a certain time period. For example, the DND function may silence notifications (e.g., some or all notifications) such that the WTRU 102 or other device may or may not display the notification, may or may not vibrate, may or may not beep, may or may not ring and/or may or may not play a sound for the notification. Different levels of notifications are generally referred to as different levels of DND. Notifications may be for and/or associated with incoming phone calls, SMS messages, e-mail messages, calendar alerts, reminders and/or other application alerts, among others. Table 1 below describes different representative levels of DND which a user may set on their WTRU 102 or other mobile device.

TABLE 1

Description of DND Levels

| Level of DND | Description |
| --- | --- |
| Complete Silence | For example, no sound and/or no haptic when notification occurs. No notification may be displayed either. |
| Silent | For example, the notification may be displayed and/or sound/haptic may not occur. |
| Vibration Only | For example haptic may occur, the notification may be displayed, and/or sound may not be played. |
| Disabled | Notification may be displayed with sound and/or haptic (e.g., possibly haptic). |

Although Table 1 shows certain representative levels for DND, one of skill understands that a large number of different DND levels are possible based on the various types of alerts (displaying of a notification, vibration of the WTRU 102 (e.g., at different levels), beeping of the WTRU 102 (e.g., at different levels), ringing of the WTRU 102 (e.g., at different levels) and/or playing of sound (e.g., a sound track (e.g., at different levels) among others).

Users may enable the DND features/functions for a specific period, and/or based on location. A software application may trigger the DND function (e.g., based on DND rules). For example, if a user is in a meeting, the device may automatically (e.g., without human intervention) enter a DND mode when the meeting begins (e.g., when the time for the meeting occurs) and/or based on sensor data (e.g., location data (which may include GPS data or a specific beacon) associated with the meeting and the WTRU 102) and may automatically (e.g., without human intervention) exit the DND mode when the meeting ends (e.g., when the time for the meeting ends) and/or based on sensor data (e.g., location data associated with the meeting and the WTRU 102). In certain representative embodiments, users may specify one or more people that may bypass the DND features/functions (e.g., to enable their notifications) to always be received (e.g., via sound, haptics, and/or display, among others), based on the level of DND set or determined for the particular person.

All meetings may not be considered equal. Some meetings may be more important than others and may require the full attention of the user. These types of more important meetings may include strategy sessions, budget planning meetings and/or a user's annual review. Other meetings may be less important and an occasional interruption may not have significant impact (e.g., may not have a significant productivity impact, delay on the meeting and/or be undesirable, among others). These types of less important meetings may include brainstorming sessions, weekly status meetings and/or a synch-up meeting with a peer. In some situations (e.g., meetings and/or other activities), receiving notifications may be acceptable, for example, from all people or from selected people (e.g., on the user's whitelist) and in other situations notifications (e.g. all notifications) may be disabled. A whitelist herein generally refers to a list of people that the user wishes to allow to contact (e.g., allow to notify) the user, for example, when the DND features/functions would suppress the level of notification and/or disable the notification.

In certain representative embodiments, rules for use of the DND features/functions may be implemented, for example, to make the DND features/functions easy to use. For example, the rules may allow users to disable or enable the DND features/functions and/or suppress/enhance the DND level based on a trigger, an activity and/or an event (e.g., which may otherwise causes the user to miss important messages, receive unimportant messages and/or not respond in a timely manner). By enabling rule based DND features/functions, the DND features/functions may be enabled (e.g., always be enabled) alleviating embarrassing situations such as a user's phone ringing during a meeting with executives (for example, by automatically setting the DND levels on devices based on who participates in the meeting).

In certain representative embodiments, a user's DND level on a WTRU 102 (e.g., his/her device) may be adjusted and/or set based on whether a meeting includes, for example, superiors, peers and/or subordinates.

In certain representative embodiments, a user's DND level on the WTRU 102 (e.g., his/her device) may be adjusted and/or set based on a relative priority between the person associated with the incoming call (e.g., interrupting notification) and meeting participants including, for example superiors, peers and/or subordinates. For example, the person or people associated with a call may be a superior (an immediate boss, or a next level up boss) and the meeting participants may be (subordinates) such that the relative priority of the call may be high or very high and the DND level may be determined to provide a full set of notifications. This may include a special ringtone as a sound alert, vibration, a display of the notification on the display screen and/or flashing of the display screen and/or notification.

In certain representative embodiments, the DND level may be automatically set based on the importance of the meeting, for example, as determined by the titles of the meeting participants relative to the user's title. In other representative embodiments, the type of meeting (e.g., financial group meeting, technology group meeting, and/or accounting group meeting, among others) and/or the level of meeting (e.g., board meeting, executive staff meeting, and/or vice president staff meeting, among others) may be used to determine DND levels.

Figure 4:
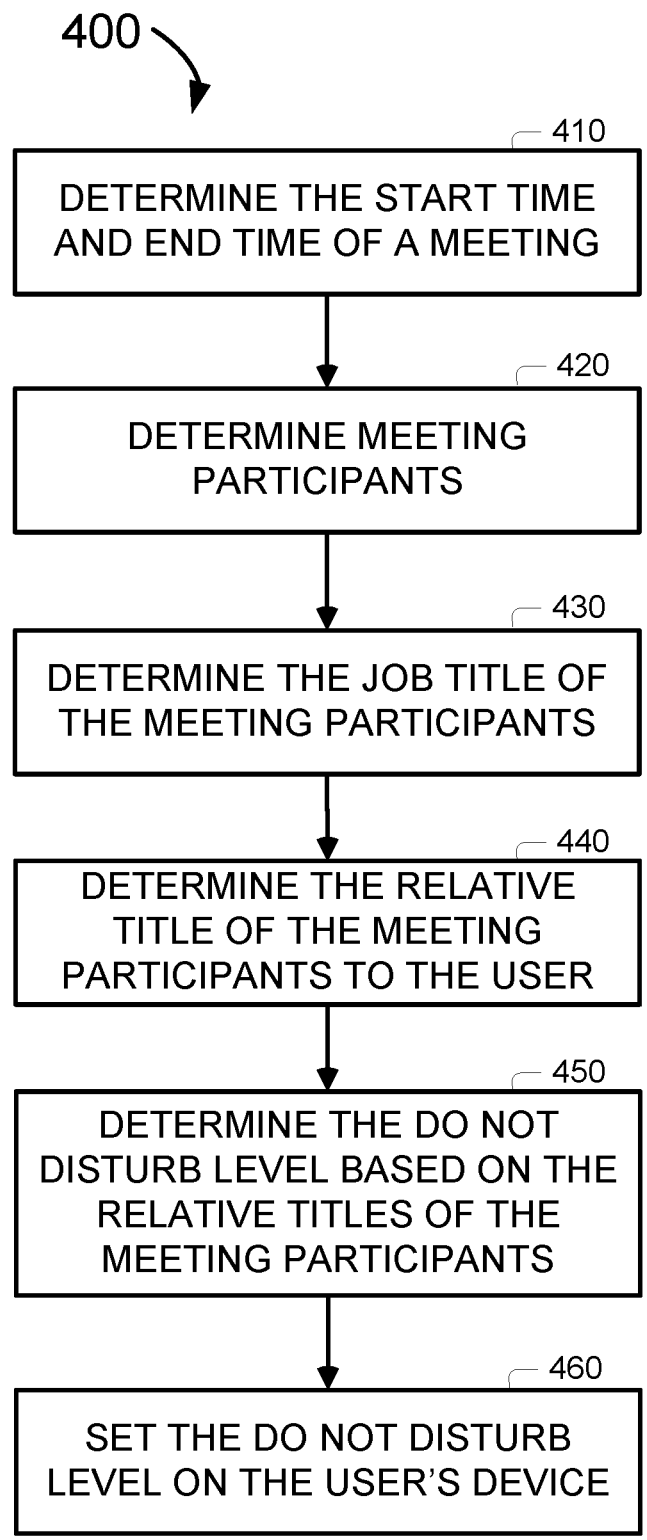
FIG. 4 is a diagram illustrating a representative DND procedure.

FIG. 4 is a diagram illustrating a representative DND procedure.

Referring to FIG. 4, the representative DND procedure 400 may include, at block 410, a determination of a start and/or an end time of a meeting. At block 420, meeting participants may be determined. At block 430, job titles of the meeting participants may be determined. At block 440, the relative title and/or level of the meeting participants to the user may be determined. At block 450, the DND level may be determined based on the relative titles and/or levels of the meeting participants. At block 460, the determined DND level may be set on the user's WTRU 102 (e.g., using the DND logic 350).

For example, a meeting participant may enter a meeting room or begin a meeting. The meeting participant may be scheduled for a meeting, the meeting participant may be sensed via sensors on the WTRU 102 (e.g., a mobile device for which the DND level is to be determined) to be in a particular location for a scheduled meeting with other meeting participants, and/or the mobile device 102 may scan for other devices operated by other participants at a scheduled or unscheduled meeting. It is contemplated that the DND procedure may be initiated (e.g., triggered) by any information which indicates that a meeting of two or more participants is occurring. The information may be obtained via the adapters 310, 320 and 330 and may include any of: (1) identification of a start time associated with a scheduled meeting; (2) an identification of a location associated with a scheduled meeting; (3) identification of device identifiers associated with participants of a scheduled meeting; (4) identification of a network associated with the scheduled meeting; and/or (5) identification of a call (e.g., communication) associated with the scheduled meeting (e.g., the mobile device 102 and/or other devices originating or receiving a teleconferencing call associated with the scheduled meeting.

The mobile device (e.g., the WTRU 102) may automatically (e.g., without human intervention) and/or based on user input via an user interface (e.g., interfaces 124, 126 and 128 and/or, for example DND user interface 340) determine any of: (1) whether one or more superiors are present at the meeting; and/or (2) whether one or more peers are present at the meeting, among others.

Although, FIG. 4 shows that the determination of superiors and peers are determined in a particular order, it is contemplated that the determination may be made in any order and that other types of meeting participants may be considered for the determination. For example, in certain representative embodiments, the determination may consider, in addition to or in lieu of the superiors and/or peers, other participants including one or more subordinates. It is also contemplated that different levels of an organizational hierarchy (e.g., either relative to the user's level in the organization or without reference to the user's level) in the organization may be used for this determination. Based on DND rules (for example, stored in database 360 and/or processed via the DND logic 350) associated with the different categories of participants at the meeting, the DND level may be determined. For example, if superiors are present at the meeting, the DND level may be set at a high level to provide, for example complete silence (see Table 1). It is contemplated that the highest level may be predetermined or user programmed to any of the levels shown in Table 1. In certain representative embodiments, the DND level may be set such that a special ringtone, flashing of the user device (e.g., the WTRU 102) and/or an increase in the sound volume is set to alert the user to incoming calls, for example, from preferred and/or high ranking people in the organization (e.g., above a threshold level in the organization).

Certain representative embodiments may prevent embarrassing interruptions due to forgetting to manually adjust DND levels. Certain representative embodiments may select (e.g., intelligently and/or automatically select) appropriate levels of notification.

Figure 5:
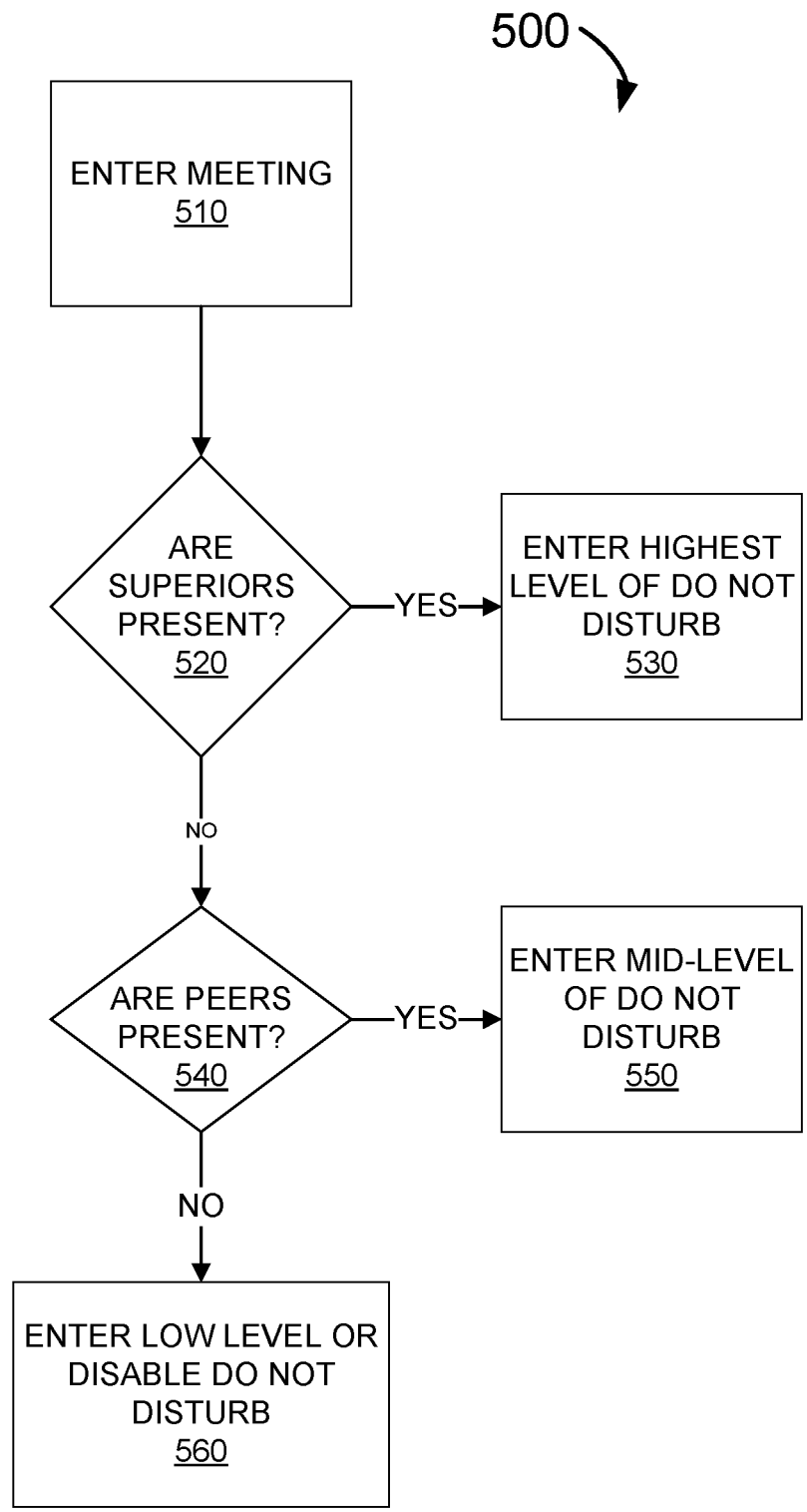
FIG. 5 is a diagram illustrating a representative setup procedure.

FIG. 5 is a diagram illustrating a representative setup procedure.

Referring to FIG. 5, the representative setup procedure 500 may include, at block 510, a user entering a meeting (e.g., physically entering a meeting or logically entering a meeting via a conferencing device/system). At block 520, the WTRU 102 or another mobile device may determine whether superiors are and/or will be present at the meeting. At block 530, on condition that one or more superiors are and/or will be present at the meeting, the WTRU 102 or mobile device may enter a highest DND level (e.g., a complete silence mode). At block 530, on condition that no superiors are and/or will be present at the meeting, processing may move to block 540. At block 540, the WTRU 102 or another mobile device may determine whether peers are and/or will be present at the meeting. At block 530, on condition that one or more peers are and/or will be present at the meeting, the WTRU 102 or mobile device may enter a mid-level DND level (e.g., silence or vibration only mode). At block 560, on condition that no peers are and/or will be present at the meeting, the WTRU 102 or mobile device may enter a low DND level (e.g., a disabled mode).

Although three different levels of DND are shown in FIG. 5, any number of such levels are possible based on differing levels (e.g., associated with an organization hierarchy and/or job titles, among others) of the meeting participants.

It is contemplated that a participant may be present based on: (1) a physically presence or at the meeting and/or (2) a logical (e.g., on-line) presence at the meeting (e.g., via a conferencing device/system include, for example the WTRU 102 itself).

For example, the user may have a meeting scheduled with at least one other participant. An application (e.g., a software application) and/or the DND logic 350 may determine start and/or end times of the meeting. The application and/or the DND logic 350 may access a list of participants from a meeting invitation via one or more of the adapters 310, 320 and 330. The application and/or the DND logic 350 may obtain positions and/or titles of the meeting participants.

In certain representative embodiments, the application and/or the DND logic 350 (e.g., using an algorithm) may rank the participants by their positions and/or titles and/or the application and/or the DND logic 350 may execute a findMax( ) type of function to determine a highest position among the meeting participants.

In certain representative embodiments, the application and/or the DND logic 350, for example via an algorithm may determine the relative position of some or all meeting participant to the user. Based on the output of the algorithm, the device may adjust the DND level as illustrated in FIG. 5.

Although, a particular set of levels (e.g., high DND level, mid DND level and low DND level) is shown in FIG. 5, it is contemplated that the DND actions that may correspond to those DND levels may differ. For example, if the user has a meeting which includes a superior, some peers and a direct report then the user's DND level may be set to Complete Silence or Silence. If a superior is not present, but the peers and a direct report are present then the user's DND level may be set to Silence or Vibrate Only. If the user has a meeting with only a direct report then the user's DND level may be disabled.

It is contemplated that the level of DND associated with the relevant positions of superior, peer and/or subordinate (e.g., direct report) may be set by the user. In addition, the definition of a superior, peer, and subordinate may be set to default values and/or by the user. In one example, a superior may be someone two positions or more above the user. In another example, a subordinate may be anyone in a position below the user. In a further example, a superior may be anyone in a position above the user and a subordinate may be anyone three positions or more below the user.

Although three levels in the organizational hierarchy are disclosed for illustrative purposes, it is contemplated that any number of organizational levels are possible. For example, more than three relative levels are possible in an organizational hierarchy. The organizational hierarchy may include, for example, any one or more of: board members, executives, general managers, directors, senior managers, managers and/or staff, among others. The organizational hierarchy may have even finer resolution in the grouping of employees. Correspondingly, the levels of DND may be greater than three. In certain representative embodiments, the level of DND may be set depending on the highest group in the room and not be relative to the user position. For example, a meeting (e.g., any meeting) with an executive and/or above executive level may have the DND set to Complete Silence regardless of (e.g., exclusive of) the user's relation to this level. In other representative embodiments, a meeting (e.g., any meeting) for which the highest position (level in the organizational hierarchy) participating in the meeting is manager or above may have the DND level set to Vibration Only.

In certain representative embodiments, the portion of a company where the participant works may be taken into account in determining the DND level. For example, a superior in another division of a company may have different DND rules (e.g., with a DND level adjustment) than a superior from the same division of the company.

Figure 6:
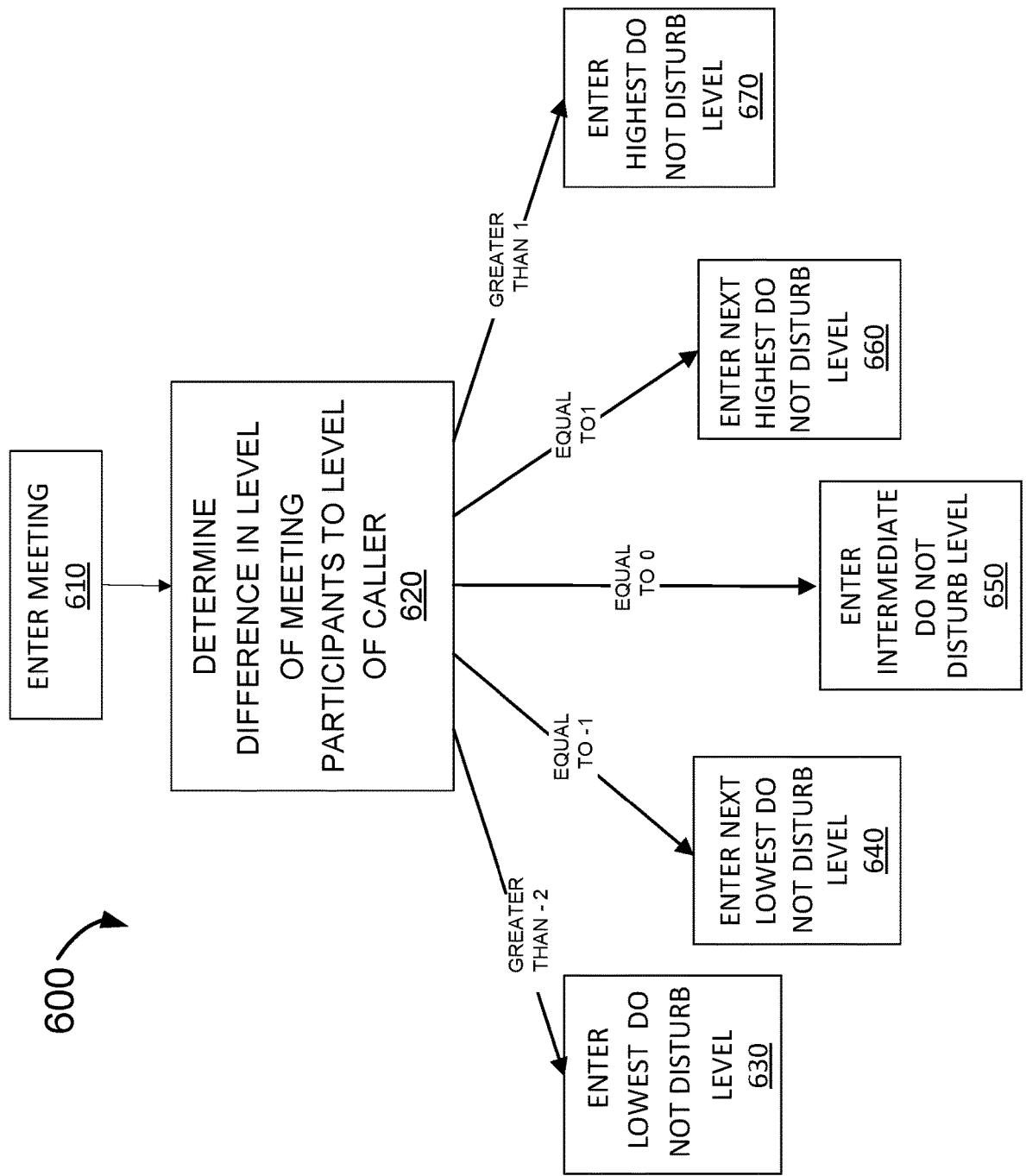
FIG. 6 is a diagram illustrating another representative DND procedure.

FIG. 6 is a diagram illustrating a representative DND procedure.

Referring to FIG. 6, the representative DND procedure 600 may include, at block 610, a user entering a meeting (e.g., physically and/or logically). At block 620, the WTRU 102 or other mobile device may determine a difference in the level of the meeting participants to the level of a notifier (e.g., meeting notifier, for example a caller and/or a texter, among others). The level of the notifier (e.g., meeting intervenor) and/or the level of the meeting participants may be established, as disclosed herein. For example, the highest level associated with one or more notifiers (e.g., meeting intervenors) and/or the highest level associated with one or more meeting participants may be used to establish the difference, although many other ways to establish this difference are possible and may be implemented via DND rules (e.g., stored in the database 360 and executed in the DND logic 350). At block 630, on condition that the difference between the meeting participants and the notifier is −2 (e.g., the meeting participants are two levels lower than the notifier), the WTRU 102 may enter and/or set the DND level to a lowest DND level (e.g., a disabled mode). At block 640, on condition that the difference between the meeting participants and the notifiers is −1 (e.g., the meeting participants are one level lower than the notifiers), the WTRU 102 may enter and/or set the DND level to a next lowest DND level. At block 650, on condition that the difference between the meeting participants and the notifiers is 0 (e.g., the meeting participants are the same level as the notifiers), the WTRU 102 may enter and/or set the DND level to an intermediate DND level. At block 660, on condition that the difference between the meeting participants and the notifiers is 1 (e.g., the meeting participants are one level higher than the notifiers), the WTRU 102 may enter and/or set the DND level to a next higher DND level. At block 670, on condition that the difference between the meeting participants and the notifiers is 2 (e.g., the meeting participants are two levels higher than the notifiers), the WTRU 102 may enter and/or set the DND level to a highest DND level.

A processor (e.g., the processor 118 and/or the DND logic 350 of the WTRU 102 (e.g., the user's device) or a network entity (e.g., a network server) may enable any of the determining procedures disclosed herein. Certain representative embodiments herein may be implemented on the user's device, may be implemented in a software application or in the operating system.

Although the disclosure herein generally refers to an application initiating and/or running such representative procedures, the software application executing the representative procedures may reside on a user device and/or a network server and may be executed on multiple entities (e.g. user device, corporate server, and/or third party server, among others).

It is contemplated that the WTRU 102 and the network server or other entity may communicate directly or via a communication network. For example, the network server or other entity and the WTRU 102 may communicate directly via Bluetooth technology and/or via infrared technology and/or indirectly via a LAN, via a WLAN, via a WAN and/or via a cellular network (not shown), among others.

It is contemplated how to set the DND level based on meeting participants. Such functionality may not override any existing whitelists or rules for allowing notifications or communications to be received based on the sender. For example, if a user's DND settings includes a rule to always ring when receiving calls from a spouse or from a child's school then the user may be (e.g., may still be) notified of these incoming calls regardless of who is attending the meeting.

Representative Procedures for Determining the Start and End Times of a Meeting

The start and end times of the meeting may be determined through an API function call, an exchange server query and/or by synchronizing to the calendar. The application may invoke an API function call to the calendar to determine when the user's meetings begin and/or end over a certain time period.

The start and end times of the meeting may be determined through an API function call, an exchange server query and/or by synchronizing to the calendar. The application may invoke an API function call to the calendar to determine when the user's meetings begin and/or end over a certain time period.

In certain representative embodiments, if the meeting ID from a previous function call is known, the application and/or the DND logic 350 may invoke an API function call for the specific meeting start and/or end times with the meeting ID, as an input. In certain representative embodiments, the application and/or the DND logic 350 may query an exchange server for the meeting start and/or end times over a period of time or for a specific meeting. These API function calls or exchange serve queries may be done periodically. In other representative embodiments, the application may synchronize to the user's calendar so that the application may receive notifications when meetings have been added and/or deleted. The application and/or the DND logic 350 may query the server and/or the API function to retrieve the meeting start and/or end times (e.g., via the adapters 310, 320 and 330). It is contemplated that prior to queries and/or function calls (e.g., any queries or function calls), the application and/or the DND logic 350 may authenticate on the user's behalf. The application and/or the DND logic 350 may use well-known authentication protocols such as OAuth 2.0, among others.

Within a few minutes of the meeting start time and/or at some time prior to the meeting, the application and/or the DND logic 350 may query the server and/or API function to determine who is to attend the meeting. Since the other attendees may decide not to attend the meeting at the last minute, the list of attendees may be retrieved close to the meeting start time. In certain representative embodiments, however, the list of attendees may be retrieved well before the meeting. For example, when the application and/or the DND logic 350 retrieves the start and/or end times for a meeting, it may retrieve a list of attendees within the same response and/or in a subsequent query/response. In another embodiment, the user (e.g., via the user interface 124, 126 and 128 and/or the DND user interface 340) may be prompted to confirm a list of attendees near the meeting start time. In certain representative embodiments, the list of meeting participants may be obtained from the API and may be updated dynamically during the meeting based on the participants that are actually present in the meeting. In videoconference types of meetings using tools such as Skype and/or Lync, this information may be obtained (e.g., easily obtained) based on which participants and/or other people are connected to the meeting at any point in time. For meetings where participants are physically present in a room and/or joining by phone, the information about participants may either be entered manually by a participant and/or the organizer or the information may be obtained using face detection, voice recognition, employee/visitor badge tracking and/or cell phone tracking techniques, among others.

Representative Procedures for Determining Impromptu Meetings

Some meetings (e.g., important meetings) may occur without being scheduled. For example, a manager may ask a subordinate to step into his office for a closed door (e.g., an important closed door) meeting. These situations may not be able to be determined by a schedule and may be determined by detecting when the participants are in the same room. Indoor location methods, such as, but not limited to, triangulation and/or iBeacons, may be used to detect when users' devices are in close proximity (e.g., are in the same room). Devices or WTRUs 102 may detect proximity to other devices or WTRU 102, for example, by scanning for PAN (personal area networks) with a strong signal strength (e.g., above a threshold level). Client devices may send (e.g., periodically or based on certain triggering conditions (e.g., other devices being detected)) their location information and/or their device information (e.g., including the device's owner/user) to a central server. In certain representative embodiments, surrounding (e.g., neighboring) device location information and/or surrounding device information (e.g., including the surrounding device's owner/user) may be sent to the central server. The central server may return information to the devices about nearby users, for example to enable proximity detection for enabling DND levels based on proximity to various neighboring user devices (e.g., as proximity to certain employees and/or non-employees).

Representative Procedures for Determining Job Titles (e.g., Positions) of Meeting Participants In certain representative embodiments, an application (e.g., software application) may query a server and/or API function to determine the job title of one or more participants (e.g., each of the participants) scheduled for a meeting and/or in proximity to a user's WTRU 102 (e.g., mobile device). The information may have been retrieved in a response from a previous query and/or may be a separate query. There may be instances when the job title information is unavailable. In some cases, job title information may not be populated or may be unknown, for example, when a meeting includes external participants (e.g., non-employees, visitors and/or contractors, among other) who are not members of the user's organization. When the information associated with a meeting participant is unknown and/or not available, the application may attempt to retrieve the attendee's job title through other representative procedures.

If the attendee is a member of one or more social network websites, the application and/or the DND logic 350 may query an API to the social network website to retrieve the attendee's job title. For example, if the application and/or the DND logic 350 has permission to access the user's LinkedIn contacts, the application and/or the DND logic 350 may invoke an API call to LinkedIn requesting the attendee's job title. In certain representative embodiments, the application and/or the DND logic 350 may integrate with and/or interface with a web crawler application. By searching the attendee's name along with their company name, the web crawler may return the attendee's job title. The date of the webpage, which returns the attendee's job title, may be verified to ensure the data is current (e.g., not out of date and/or within a threshold timeframe from the current date).

Although job title is used herein as an example for determining absolute and/or relative importance and/or level of a participant or of another user within the organization, it is contemplated that other characteristic or qualifier may also provide an indication of the importance and/or level of a participant or of other user in a meeting. For example, user privileges on the organization's network for a participant, exempt vs non-exempt status of the participant, office location, and/or office size, among others may indicate a participant's importance within the organization. As such, the use of the expressions "job title", title, or position is meant to include at least any characteristic or qualifier in a user's profile that can be used to identify the absolute or relative importance of a participant or of the other user within the organization including "levels" that certain organizations uses to express hierarchy. In certain representation embodiments, the importance and/or level of a person in an organization may be determined by a pay level of the person.

Representative Procedure for Determining the Relationship of Job Titles Between a User and Various Meeting Participants When the application and/or the DND logic 350 determines or obtains the meeting participants and/or their job titles, the application and/or the DND logic 350 may determine the relationship of the job title of the user to the job titles of one or more meeting participants. In various representative embodiments, the organizational hierarchy may be supplied (e.g., via a human resources interface and/or other calendar/security function which identifies an organizational hierarchy) to the application. The company may generate an organizational structure and the relationships within the organization and may provide them to the application and/or the DND logic 350, for example, via the adapters 310, 320 and 330. In certain representative embodiments, the application (e.g., the database and/or the DND logic 350) may have its own ontology of job titles. The application may have a default ontology, which may place predetermined job titles (e.g., hundreds or thousands of various job titles) in hierarchical order.

In certain representative embodiments, the application may adjust the organizational hierarchy based on user input. During a meeting, a notification may be displayed on the user device or WTRU 102 for example using display 128. The notification may display the DND level. The notification may display, automatically (e.g., with user intervention), the highest job title of a participant in the meeting and/or may display, based on user input (e.g., user intervention via user interface 124, 126 and 128), the highest job title of a participant in the meeting. The notification may display, automatically (e.g., with user intervention), a list of attendees that are in the meeting and their job titles and/or may display, based on user input (e.g., user intervention), the list of attendees in the meeting and their job titles.

In certain representative embodiments, the list may include hierarchy information (e.g., the attendees' relative job position, as a superior, a peer or a subordinate). The list may be in order of job title or relative job position, among others. The order of the list may be selectable and the user may be able to change the order of the list based on a selection of job title or relative position, among others. The application may account for a preference order (e.g., the last selection made by the user regarding the order, for example, the changed list order or a preferred order preset by the user) for future meetings. In certain representative embodiments, a user may be able to modify the status of a meeting participant (for example, from subordinate to peer) either locally for the WTRU 102 (e.g., user's device) or more globally for the WTRU 102 (e.g., the user's device) and other devices. For example, changes by a user may be accounted for on a user's account only or the changes may be applied to other users in the corporation. Changes by the user to the list may modify the DND level.

For example, if Alice is a staff accountant and is in a meeting with Bob, who is a marketing specialist. The notification on Alice's device may show that Bob is a superior of Alice. Alice may adjust the list to provide that (e.g., show that) Bob is a peer. In future meetings with Bob, the application may consider Bob, as a peer. In certain representative embodiments, the application and/or the DND logic 350 may consider any marketing specialists in meetings with Alice, as a peer. If Charlie is a colleague of Alice, who is a staff accountant, in certain representative embodiments, the application and/or the DND logic 350 on Charlie's device may consider Bob, as a peer, in future meetings with Bob based on Alice's modification. In certain representative embodiments, the application and/or the DND logic 350 on Charlie's device may consider all marketing specialists, as peers, based on Alice's modification.

Representative Procedure for Determining the DND Level

The application and/or the DND logic 350 may determine the DND level for the device (e.g., the WTRU 102) based on the relative job position of the meeting participants. The DND level for a relative job position (e.g., each relative job position) may be configured based on user preference, based on a corporate policy and/or based on a default value in the application and/or the DND logic 350. If it is based on a corporate policy, the user may have the ability to override the policy with a set of user preferences. For example, the application may default to Silent level for superiors, Vibration Only for peers and/or disabled for subordinates. A superior may be someone two levels above or higher relative to the level of the user in the organizational hierarchy. A peer may be someone immediately above, the same level, or immediately below relative to the level of the user in the organizational hierarchy. A subordinate may be someone two levels below or lower relative to the user in the organizational hierarchy.

Although different categories are used to define meeting participants based on the organizational hierarchy, it is contemplated that any number of different categories defined by different relative or absolute levels in the organizational hierarchy may be implemented with predefined or adjustable rules (e.g., adjustable by the corporation and/or by the user).

The application and/or the DND logic 350 may set the DND level on the WTRU (e.g., user device) or other device. The application and/or the DND logic 350 may push the DND level to other devices the user owns. The decision to send the DND level to other devices may depend on whether the other devices are in short range communication with the user device (e.g. Bluetooth, ZigBee or accessing the same WLAN SSID). In certain representative embodiments, the application and/or the DND logic 350 may push the DND level to all devices (e.g., the WTRUs 102) in a meeting. This may occur, for example, on conditions that the devices (e.g., the WTRUs 102 are connected to the same WLAN/iBeacon and/or to other devices of the user, such as wearable and non-wearable devices, and/or within proximity to each other.

Representative Procedure for Dynamically Overriding DND Based on Caller/Interrupter and Attendees A comparison of (e.g., the logic of comparing) a user with the relative job positions of the attendees may be implemented on incoming calls and/or messages to compare a caller, interrupter and/or sender with the meeting attendees. If the caller, interrupter and/or sender outranks (e.g., is of a higher level in the organizational hierarchy than) the meeting attendees (e.g., each of the meeting attendees), the current DND may be overridden, and the user may be notified, as usual. For example, if a user is in a meeting with his managers and the DND is set to the highest level, a call from a Vice President of the company may override the DND and the user may be notified of the call with by the usual notification procedure (e.g., by a normal ringtone and/or a display of the call notification). If that same user is in a meeting with the Chief Executive Officer of the company, a call from the VP may not override the DND setting. Alternatively, if the caller, interrupter and/or sender outranks the user, the current DND may be overridden and the user may be notified as usual (e.g., the call from the VP may always override the DND setting).

Representative Procedure for Deferred Notification

In certain representative embodiments, when a meeting or multiple meetings in a row are over any notifications that were blocked and/or silenced during the meeting or meetings may then be provided (e.g., surface) on the WTRU 102 (e.g., the mobile device) to notify the user, for example. As such, the user may become accustom to look at blocked notifications just after high-level meetings, closed door meetings and/or importance meetings. This may prevent the situation where a user receives a notification (e.g., an important notification) that was blocked while in a more important meeting. If a notification was not given later, the user may not be aware that the original notification was missed.

It is contemplated that based on the time between certain meeting, the blocked notification may be provided or may continue to be blocked until the end of the sequence of meetings. For example, at the end of a particular meeting that had blocked notifications, the DND level may be reevaluated based on the next meeting's priority to determine whether to block or allow a notification.

DND levels may be based on a single person. For example, a WTRU (e.g., a mobile device) may be silenced when attending a meeting with a certain peer. As another example, a device may disable DND when attending a meeting with a specific subordinate. In certain representative embodiments, rules for DND may be based on a certain group of people. For example, the device may be silenced (e.g., always be silenced) when meeting with anyone from Finance or may disable DND (e.g., always disable DND) when meeting with anyone from Marketing. In certain representative embodiments, the user may create a prioritized list based on users or groups such as any of: (1) silence the device when meeting with the CEO or executive management; (2) silence the device when meeting with immediate supervisor; (3) disable DND when meeting with Human Resources; (4) enter Vibrate only mode when meeting with a particular person (e.g., Joe Smith); and/or (5) for all other cases follow the procedures disclosed in FIG. 4. It is contemplated that the prioritized list may be useful for CEOs and executive management that may meet (e.g., who primarily meet) with subordinates.

Representative Procedures for Adjusting the Level of DND According to the Level of Activity of the Participant within the Meeting In addition to or in lieu of adjusting the level of DND depending on and/or based on hierarchical level of the other participants, it may be appropriate to adjust the level of DND according to a level of activity of the participant within the meeting. A device (e.g., one or more meeting devices, a meeting platform and/or a meeting application, for example Skype and/or Lync, among others), for example as part of a corporate intranet 112 or available via the Internet 110, may monitor the participation level of the participant in the meeting based on one or more measurements, for example of: (1) how frequently (or infrequently) the participant speaks; (2) shares his or her screen with the other meeting participants; and/or (3) any other action from and/or of the participant that would be a proxy for his or her involvement in the meeting via the meeting devices. For example, the WTRU 102 (e.g., the participant's device) or a network device may set and/or may control the setting of the DND level (e.g., of the participant's device) to an intermediate level if or under the condition that the participant has not spoken for at least a threshold period of time (e.g., at least 10 minutes). In certain representative embodiments, a device (e.g., the meeting device) may control the level of the DND to decrease (e.g., keep decreasing) the level of DND to a lower level (e.g., ever lower levels) for a period (e.g., every subsequent period) the participant is inactive in the meeting. The meeting device may elevate the level of DND as soon as and or when the participant starts to increase the level of participation in the meeting. The level of participation of the participant may be measured by the meeting device by sensing (e.g., directly sensing) the participant's behaviors including speaking (e.g. via microphones and speech detection software detecting that the participant is speaking) and/or through an API to the meeting platform or application (e.g. Skype and/or Lync, among others).

Representative Procedures for Adjusting the Level of DND According to the Level of Engagement of the Participant with its Own Device In the case where a participant engages its device (e.g., a user device and/or a WTRU 102) during a meeting, the device or WTRU 102 may adjust downward the level of DND. For example, if or on condition that a participant picks up the WTRU 102, starts to send text messages and/or starts to write emails, the WTRU 102 may reduce the level of DND, for example, to allow notifications of such systems. The device and/or WTRU 102 may prompt the participant as to his desire to confirm the adjustment of the DND level. The monitoring the level of use of the WTRU 102 (e.g., the user's device) may be measured in: (1) time (e.g., in seconds or another time period); (2) number of apps opened or being opened; (3) number of clicks; (4) number of keystrokes; and/or (5) an amount of movement and/or orientation change (e.g., fidgeting) the device is subjected to (for example, using or based on GPS, changes in the device's position and/or orientation and acceleration sensors).

Representative Procedures for Ordering Participants Using Hierarchical Level when Scheduling the Meeting The participant's level within an organization may be used to facilitate scheduling of meetings. In many organizations, a meeting organizer may use tools such as Microsoft Outlook to schedule a meeting and may have to find a timeslot that is suitable to the group of participants In many instances, the meeting organizer trades off (e.g., may need to tradeoff) the conflicting schedules of different participants against the desire not to delay the meeting too far in the future. Having the scheduling tool display the schedules of participants in a way that sorts or group participants using their level (e.g., hierarchical level) may facilitate the work of the meeting organizers by visually elevating the schedules of the listed participants that may have a larger influence in the decision-making within the meeting.

FIG. 7 is a flowchart illustrating a representative method.

Referring to FIG. 7, the representative method 700 for adjusting DND levels in a WTRU 102 may include, at block 710, the WTRU 102 determining that a user of the WTRU 102 is participating in a meeting. At block 720, the WTRU may obtain organizational hierarchy information. At block 730, the WTRU 102 may determine a priority associated with one or more meeting participants of the meeting based on the organizational hierarchy information. At block 740, the WTRU 102, on condition that the user is participating in the meeting, may adjust, without user input, a DND level of the WTRU 102 based on the determined priority.

In certain representative embodiments, the WTRU 102 may suppress or may allow a notification from a notifier based on the adjusted and/or configured DND level.

In certain representative embodiments, the WTRU 102 may obtain scheduling information associated with the user of the WTRU 102, and/or may evaluate based on the scheduling information, whether the user is participating in the meeting. For example, the meeting may be any of: (1) a face-to-face (e.g., an in-person) meeting; (2) an on-line meeting and/or (3) an ad hoc meeting.

In certain representative embodiments, the scheduling information may include session information regarding a session associated with the on-line meeting. For example, a meeting generally refers to: (1) a face-to-face meeting (e.g., an in-person meeting), (2) a teleconference and/or (3) a video conference meeting, among others.

In certain representative embodiments, the WTRU 102 may evaluate whether the user is participating in the on-line meeting based on whether the session information indicates that the user has activated the session.

In certain representative embodiments, on condition that or when the meeting is a face-to-face meeting: the scheduling information may include: (1) a location of the face-to-face meeting; and/or (2) a time of the face-to-face meeting. For example, the WTRU 102 may evaluate whether the user is participating in the face-to-face meeting based on a comparison of: (1) the location included in the scheduling information to a location of the WTRU 102 and/or (2) the time of the face-to-face meeting included in the scheduling information to a current time.

In certain representative embodiments, on condition that the meeting may be an ad hoc meeting, the WTRU 102 may evaluate whether the user is participating in the ad hoc meeting based on any of: (1) whether one or more other WTRUs 102 are in a vicinity of the WTRU 102 and remain in the vicinity of the WTRU 102 for a threshold period of time; or (2) whether one or more other WTRUs 102 are on a common personal area network with the WTRU 102 of the user and remain on the personal area network for a threshold period of time.

In certain representative embodiments, the WTRU 102 may determine any of: a start time for the meeting based on information from a calendar application; and/or a location of the meeting based on the information from the calendar application.

In certain representative embodiments, the WTRU 102 may receive via an interface/adapter 310, 320 and/or 330, any of: (1) the priority for the meeting; (2) information including a list of participants of the meeting; (3) job title information of the participants of the meeting; (4) information including a name of a highest ranking participant of the meeting and/or (5) job title information of the highest ranking participant of the meeting.

In certain representative embodiments, the WTRU 102 may establish DND rules for adjusting the DND level in accordance with at least the organizational hierarchy information; and may adjust the DND level to modify notifications in accordance with the established DND rules.

In certain representative embodiments, the WTRU 102 may adjust the DND level of the WTRU 102 based further on any of: (1) a participation level of the user in the meeting; and/or (2) an activity level on the WTRU 102.

In certain representative embodiments, the WTRU 102 may increase the DND level and may suppress notifications during the meeting, on condition that one or more participants of the meeting are superior in organizational hierarchy level relative to the organizational hierarchy level of the user of the WTRU 102; and may set the DND level to remain at the same DND level or may decrease the DND level during the meeting by the WTRU 102, on condition that each of the participants of the meeting are subordinates in organizational hierarchy level relative to the organizational hierarchy level of the user of the WTRU 102.

In certain representative embodiments, the WTRU 102 may increase the DND level and may suppress notifications during the meeting, on condition that one or more participants of the meeting are any of: above a threshold level in organizational hierarchy or in a particular organization group and may set the DND level to remain at the same DND level or decrease the DND level during the meeting, on condition that each of the participants of the meeting are any of: below a threshold level in organizational hierarchy or in a particular organization group. Suppression of notifications generally refers to one or more of: (1) a delay in notification; (2) a reduced form of notification (e.g., only vibration and not display of the notification and vibration); and/or (3) a suppression without any notification (e.g., complete suppression of all forms of notification).

In certain representative embodiments, the WTRU 102 may determine an end time for the meeting of the user based on any of: (1) information from a calendar application; or (2) a location of the meeting and a location of the WTRU 102 of the user. The WTRU 102 may readjusting or resetting the DND level after the end time of the meeting and may provide without user intervention, a notification after the meeting ends that may be suppressed during the meeting.

In certain representative embodiments, the WTRU 102 may determine an end time for a sequence of meeting of the user and a DND level associated with each meeting of the sequence. The WTRU may delay a notification to the user until a time period in which a priority associated with the notification exceeds the priority of the DND level associated with that particular meeting in the sequence (e.g., the notification will be delayed and will be presented at that meeting time, when the meeting does not exceed the priority of the notification). The WTRU 102 may trigger the notification on a condition that the priority associated with the notification exceeds the priority of the DND level associated with the meeting (e.g., one of the meetings of the sequence).

In certain representative embodiments, the WTRU 102 may obtain a whitelist indicating one or more notifiers that may be exempt from suppression or delay based on the DND level. The WTRU 102 may exempt from suppression or delay any notification from other WTRUs 102 that are associated with the one or more notifiers that are on the whitelist.

In certain representative embodiments, the WTRU 102 may trigger a notification during the meeting on condition that a notifier sending the notification is superior in organizational hierarchy level relative to the organizational hierarchy level of the participants of the meeting, other than the user of the WTRU 102.

In certain representative embodiments, the WTRU 102 may suppress a notification during the meeting, on condition that a notifier sending the notification is subordinate in organizational hierarchy level relative to the organizational hierarchy level of the participants of the meeting, other than the user of the WTRU 102.

In certain representative embodiments, the WTRU 102 may trigger a notification during the meeting, on condition that any of: a notifier sending the notification is above a threshold level in organizational hierarchy or is in a particular organization group.

In certain representative embodiments, the WTRU 102 may suppress a notification during the meeting on condition that any of: a notifier sending the notification is below a threshold level in organizational hierarchy or is in a particular organization group.

In certain representative embodiments, the WTRU 102 may obtain a list of meeting participants during the meeting that may indicate the actual meeting participants at the meeting. The WTRU 102 may update the one or more meeting participants in accordance with the list. The WTRU 102 may modify the DND level of the WTRU 102 based on the updated meeting participants.

In certain representative embodiments, the WTRU 102 may obtain information indicating that respective participants are identified to be in the meeting.

In certain representative embodiments, the WTRU 102 may monitor: (1) a participation level of the user in the meeting; and/or (2) an activity level on the WTRU 102, as one or more monitored levels, wherein the adjusting of the DND level includes dynamically setting the DND level of the WTRU 102 based on the determined priority and the one or more monitored levels.

In certain representative embodiments, the WTRU 102 may determine a frequency of interaction between the user and at least one other meeting participant.

In certain representative embodiments, the WTRU 102 may adjusting the DND level to one of a plurality of levels.

The WTRU 102 may suppress all forms of notification, on condition that the DND level is at a highest level. The WTRU 102 may suppress at least two forms of the notification, on condition that the DND level is at a next highest level. The WTRU 102 may suppress at least one form of the notification, on condition that the DND level is at an intermediate level. The WTRU 102 may suppress no forms of the notification on condition that the DND level is at a lowest level.

In certain representative embodiments, the WTRU 102 may determine a participation level of the user in the meeting based on any of: (1) images of the user captured by at least one conferencing device during the meeting; and/or (2) a voice print of the user captured by the same or a different conferencing device during the meeting. For example, the WTRU 102 may modify the DND level in accordance with the determined participation level.

In certain representative embodiments, the WTRU 102 may decrease the DND level during one or more periods that the determined participation level of the user in the meeting is below a threshold level.

In certain representative embodiments, the WTRU 102 may increase the DND level during one or more periods that the determined participation level of the user in the meeting is at or above a threshold level.

In certain representative embodiments, the WTRU 102 may decrease the DND level in accordance with an increased activity level of the user on the WTRU 102.

In certain representative embodiments, the WTRU 102 may increase the DND level in accordance with a decreased activity level of the user on the WTRU 102.

In certain representative embodiments, the WTRU 102 may measure an activity level of the user based on any of: (1) a time between interactions on the WTRU 102; (2) a number of apps being opened during a period of time; (3) a number of clicks during the period of time; (4) a number of keystrokes during the period of time; and/or (5) an amount of movement or orientation change of the WTRU 102 during the period of time.

FIG. 8 is a flowchart illustrating another representative method.

Referring to FIG. 8, the representative method 800 for adjusting DND levels in a WTRU 102 may include, at block 810, that the WTRU 102 may obtain information for determined priorities associated with: (1) one or more meeting participants and (2) a notifier that is attempting to notify a user of the WTRU 102. At block 820, the WTRU 102 may determine a relative priority of the meeting participants to the notifier. At block 830, the WTRU 102 may adjust the DND level of the WTRU 102 based on the determined relative priority.

In certain representative embodiments, the relative priority may be determined based on the user (e.g., as a meeting participant) and the notifier (e.g., in addition to or in lieu of the relative priority of the other meeting participants and the notifier). For example, the user may be in a meeting with managers and the DND level may be set to vibration only. If the user's direct manager calls the user or texts the user (for example that the direct manager is running late) the call and/or text may go through based on the relative priority of the user's direct manager (e.g., as the meeting notifier) to the user himself.

In certain representative embodiments, the WTRU 102 may obtain configuration information and may set a notification mode associated with the adjusted DND level based on the obtained configuration information. For example, the WTRU 102 may present or suppress a notification from the notifier using the set notification mode.

In certain representative embodiments, the WTRU 102 may suppress all notification except notifications from white-listed notifiers using a first notification mode on condition that the relative priority is highest.

In certain representative embodiments, the WTRU 102 may suppress/present the notification: (1) using a second notification mode on condition that the relative priority is next highest; (2) using a third notification mode on condition that the relative priority is zero; (3) using a fourth notification mode on condition that the relative priority is next lowest; and/or (4) using a fifth notification mode on condition that the relative priority is lowest.

In certain representative embodiments, the fifth notification mode may be more disturbing than the fourth notification mode, the fourth notification mode may be more disturbing than the third notification mode; the third notification mode may be more disturbing than the second notification mode; and the second notification mode may be more disturbing than the first notification mode.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices including the constraint server and the rendezvous point/server containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method of adjusting Do Not Disturb (DND) levels in a wireless transmit/receive unit (WTRU), the method comprising:
monitoring, by the WTRU during a meeting, any of: (1) an activity level of a user on the WTRU; or (2) a participation level of the user in the meeting;
obtaining, by the WTRU, organizational hierarchy information;
determining a priority associated with one or more meeting participants of the meeting based on the organizational hierarchy information; and
adjusting, without user input, the DND level of the WTRU based on: the determined priority and any of: (1) the monitored activity level of the user on the WTRU during the meeting; or (2) the monitored participation level of the user in the meeting,
wherein the adjusting of the DND level includes:
increasing the DND level and suppressing notifications during the meeting, on condition that one or more participants of the meeting are superior in organizational hierarchy level relative to the organizational hierarchy level of the user of the WTRU; and
remaining at the same DND level or decrease the DND level during the meeting, on condition that each of the participants of the meeting are subordinates in organizational hierarchy level relative to the organizational hierarchy level of the user of the WTRU.

2. The method of claim 1, further comprising suppressing or allowing a notification from a notifier based on the adjusted DND level.

3. The method of claim 1, wherein the obtaining of the organizational hierarchy information includes receiving, by the WTRU via an interface, any of: (1) an indication of the priority for the meeting; (2) information including a list of participants of the meeting; (3) job title information of the participants of the meeting; (4) information including a name of a highest ranking participant of the meeting; (5) information regarding paygrade of the meeting participants; or (6) job title information of the highest ranking participant of the meeting.

4. The method of claim 1, further comprising
establishing DND rules for adjusting the DND level in accordance with at least the obtained organizational hierarchy information,
wherein the adjusting of the DND level of the WTRU includes adjusting the DND level to modify notifications in accordance with the established DND rules.

5. The method of claim 1, further comprising:
determining an end time for the meeting based on any of: (1) information from a calendar application; or (2) a location of the meeting and a location of the WTRU of the user;
readjusting or resetting the DND level after the end time of the meeting; and
providing, by the WTRU without user intervention, a notification after the meeting ends that is suppressed during the meeting.

6. The method of claim 1, further comprising:
triggering a notification during the meeting by the WTRU on condition that a notifier sending the notification is superior in organizational hierarchy level relative to the organizational hierarchy level of one or more of the participants of the meeting, other than the user of the WTRU and
suppressing a notification during the meeting by the WTRU on condition that a notifier sending the notification is subordinate in organizational hierarchy level relative to the organizational hierarchy level of the participants of the meeting, other than the user of the WTRU.

7. The method of claim 1, further comprising:
obtaining, by the VVTRU during the meeting, information regarding meeting participants indicating actual meeting participants at the meeting;
updating a list of scheduled meeting participants with the obtained information regarding one or more actual meeting participants; and
modifying the DND level of the VVTRU based on the obtained information regarding the actual meeting participants.

8. The method of claim 1, wherein the adjusting of the DND level includes dynamically setting the DND level of the WTRU based on the determined priority and any of: (1) the monitored activity level of the user on the WTRU; or (2) the monitored participation level of the user in the meeting.

9. The method of claim 1, wherein the monitoring of the participation level of the user in the meeting includes monitoring a behavior of the participant via an application interface (API) to a meeting application.

10. A method of adjusting Do Not Disturb (DND) levels in a wireless transmit/receive unit (WTRU), the method comprising:
monitoring, by the WTRU during a meeting, any of: (1) an activity level of a user on the WTRU; or (2) a participation level of the user in the meeting;
obtaining, by the WTRU, organizational hierarchy information;
determining a priority associated with one or more meeting participants of the meeting based on the organizational hierarchy information; and
adjusting, without user input, the DND level of the WTRU based on: the determined priority and any of: (1) the monitored activity level of the user on the WTRU during the meeting; or (2) the monitored participation level of the user in the meeting,
wherein:
the adjusting of the DND level includes adjusting the DND level to one of a plurality of levels; and
on condition that the DND level is at:
(1) a highest level, suppressing all forms of notification;
(2) a next highest level, suppressing at least two forms of the notification;
(3) an intermediate level, suppressing at least one form of the notification; and
(4) a lowest level, suppressing no form of the notification.

11. A wireless transmit/receive unit (VVTRU) configured to adjust a Do Not Disturb (DND) level, comprising:
a transmit/receive unit configured to obtain organizational hierarchy information; and
a processor configured to:
monitor, during a meeting, any of: (1) an activity level of a user on the VVTRU; or (2) a participation level of the user in the meeting,
determine a priority associated with one or more meeting participants of the meeting based on the organizational hierarchy information, and
adjust, without user input, the DND level of the WTRU based on: the determined priority and any of: (1) the monitored activity level of the user on the WTRU; or (2) the monitored participation level of the user in the meeting,
wherein the processor is configured to adjust the DND level to:
increase the DND level and suppress notifications during the meeting, on condition that one or more participants of the meeting are superior in organizational hierarchy level relative to the organizational hierarchy level of the user of the WTRU, and
remain at the same DND level or decrease the DND level during the meeting, on condition that each of the participants of the meeting are subordinates in organizational hierarchy level relative to the organizational hierarchy level of the user of the WTRU.

12. The WTRU of claim 11, wherein the processor is configured to suppress or allow a notification from a notifier based on the adjusted DND level.

13. The WTRU of claim 11, wherein:
the transmit/receive unit is configured to obtain scheduling information associated with the user of the WTRU; and
the processor is configured to:
determine a location of the WTRU;
evaluate, based on the obtained scheduling information and the determined location of the WTRU, whether the user is participating in the meeting.

14. The WTRU of claim 11, wherein the processor is configured to:
establish DND rules for adjusting the DND level in accordance with at least the obtained organizational hierarchy information; and
adjust the DND level to modify notifications in accordance with the established DND rules.

15. The WTRU of claim 11, wherein the processor is configured to:
determine an end time for the meeting based on any of: (1) information from a calendar application; or (2) a location of the meeting and a location of the VVTRU of the user;
readjust or reset the DND level after the end time of the meeting; and provide, without user intervention, a notification after the meeting ends that is suppressed during the meeting.

16. The VVTRU of claim 15, wherein:

the meeting and one or more further meetings are scheduled consecutively; and the processor is configured to extend the time to suppress notifications to the end of at least a respectively scheduled consecutive meeting based on the adjusted DND level associated with the further meetings scheduled between a start of the scheduled consecutive meetings and an end of the respectively scheduled consecutive meeting.

17. The VVTRU of claim 11, wherein:

the transmit/receive unit is configured to obtain information regarding meeting participants during the meeting that indicate actual meeting participants at the meeting; and the processor is configured to:
   update a list of the scheduled meeting participants with the obtained information regarding one or more actual meeting participants, and
   modifying the DND level of the VVTRU based on the obtained information regarding the actual meeting participants.

18. The VVTRU of claim 11, wherein the processor is configured to dynamically set the DND level of the WTRU based on the determined priority and any of: (1) the monitored activity level of the user on the VVTRU; or (2) the monitored participation level of the user in the meeting.

* * * * *

UNITED STATES PATENT AND TRADEMARK OFFICE
CERTIFICATE OF CORRECTION

| | |
|---|---|
| PATENT NO. | : 10,547,744 B2 |
| APPLICATION NO. | : 16/066252 |
| DATED | : January 28, 2020 |
| INVENTOR(S) | : Damian Hamme, Kenneth Lynch and Vincent Roy |

It is certified that error appears in the above-identified patent and that said Letters Patent is hereby corrected as shown below:

In the Claims

1. At Column 27, Line 33; replace "VVTRU" with --WTRU--
2. At Column 27, Line 40; replace "VVTRU" with --WTRU--
3. At Column 28, Line 13; replace "VVTRU" with --WTRU--
4. At Column 28, Line 19; replace "VVTRU" with --WTRU--
5. At Column 28, Line 64; replace "VVTRU" with --WTRU--
6. At Column 29, Line 3; replace "VVTRU" with --WTRU--
7. At Column 29, Line 13; replace "VVTRU" with --WTRU--
8. At Column 29, Line 22; replace "VVTRU" with --WTRU--
9. At Column 29, Line 25; replace "VVTRU" with --WTRU--
10. At Column 29, Line 28; replace "VVTRU" with --WTRU--

Signed and Sealed this
Eighteenth Day of April, 2023

Katherine Kelly Vidal
*Director of the United States Patent and Trademark Office*